United States Patent [19]

Fujimoto

[11] Patent Number: 5,368,374
[45] Date of Patent: Nov. 29, 1994

[54] BRAKE FLUID PRESSURE CONTROL DEVICE

[75] Inventor: Tsuyoshi Fujimoto, Itami, Japan

[73] Assignee: Sumitomo Electric Industries, Ltd., Osaka, Japan

[21] Appl. No.: 130,171

[22] Filed: Oct. 1, 1993

[30] Foreign Application Priority Data

Oct. 29, 1992 [JP] Japan .................................. 4-291180

[51] Int. Cl.$^5$ .............................................. B60T 8/32
[52] U.S. Cl. ................................. 303/113.2; 303/111;
303/116.1; 303/116.2; 303/119.1
[58] Field of Search ............... 303/116.1, 113.2, 113.3,
303/116.2, 119.1, 119.2, 113.1, 111, 115.5, 115.4

[56] References Cited

U.S. PATENT DOCUMENTS

| 5,026,127 | 6/1991 | Arikawa . |
| 5,150,950 | 9/1992 | Arikawa et al. ................. 303/111 X |
| 5,169,214 | 12/1992 | Holzmann et al. . |
| 5,234,264 | 8/1993 | Willmann et al. ................. 303/113.2 |

FOREIGN PATENT DOCUMENTS

| 0482379 | 4/1992 | European Pat. Off. . |
| 0539899 | 5/1993 | European Pat. Off. . |
| 3929464 | 3/1990 | Germany . |
| 4030858 | 4/1992 | Germany . |

4-57476 5/1992 Japan .

*Primary Examiner*—Douglas C. Butler
*Attorney, Agent, or Firm*—Sandler, Greenblum & Bernstein

[57] ABSTRACT

A brake fluid pressure control device is provided, and includes a main flow path for connecting, as one system, first and second wheel brakes with a master cylinder, a first reservoir, a fluid pressure adjusting member for selectively enabling the first and second wheel brakes to communicate with the master cylinder and the first reservoir, a pump for pressurizing brake fluid in the first reservoir so as to discharge the brake fluid to a junction of the main flow path and the pump. A second reservoir which is in communication with the fluid pressure adjusting member and the second wheel brake and, a directional control valve which is adapted, in a first state, to enable the master cylinder and the fluid pressure adjusting member to communicate with each other and in a second state to interrupt communication between the master cylinder and the fluid pressure adjusting member are also provided. A control unit is also provided which, at the time of traction control, sets the directional control valve to the second state and drives the pump so as to supply the brake fluid in the second reservoir to the first wheel brake through the fluid pressure adjusting member.

4 Claims, 6 Drawing Sheets

BRAKE FLUID PRESSURE CONTROL DEVICE

BACKGROUND OF THE INVENTION

The present invention generally relates to brake fluid pressure control and more particularly, to a brake fluid pressure control device which is capable of performing traction control by adding a simple arrangement to a brake fluid control device for antiskid control.

Conventionally, a brake fluid pressure control device has been provided which is capable of performing not only antiskid control but traction control by adding devices to a brake fluid pressure control device for antiskid control. For example, such a brake fluid pressure control device is proposed in Japanese Utility Model Laid-Open Publication No. 4-57476 (1992) as shown in FIG. 6. In the known brake fluid pressure control device of FIG. 6, so-called X-shaped piping is employed. Thus, a wheel cylinder 4A for a front left driving wheel 3A and a wheel cylinder 4B for a rear right driven wheel 3B are connected with a pipe line 2A communicating with a master cylinder 1, while a wheel cylinder 4C for a front right driving wheel 3C and a wheel cylinder 4D for a rear left driven wheel 3D are connected with a pipe line 2B communicating with the master cylinder 1.

Namely, the master cylinder 1 is connected with the wheel cylinders 4A and 4C for the front left and right wheels 3A and 3C through the pipe lines 2A and 2B, three port connection and two position solenoid valves 6A and 6B and three port connection and three position solenoid valves 7A and 7B, respectively. Meanwhile, the wheel cylinders 4B and 4D for the rear right and left wheels 3B and 3B are connected, via three port connection and three position solenoid valves 9A and 9B, with pipe lines 8A and 8B branched from the pipe lines 2A and 2B, respectively.

Meanwhile, in the known brake fluid pressure control device, the front left wheel 3A and the rear right wheel 3B are connected with a reservoir 11A by way of the solenoid valves 7A and 9A, respectively, while the front right wheel 3C and the rear left wheel 3D are connected with a reservoir 11B through the solenoid valves 7B and 9B, respectively. Suction sides 12a of pumps 12A and 12B are, respectively, connected with the reservoirs 11A and 11B, while discharge sides 12b of the pumps 12A and 12B are, respectively, connected with the pipe lines 2A and 2B. The pumps 12A and 12B are further connected, via the solenoid valves 7A and 7B, with the wheel cylinders 4A and 4C for the front left and right wheels 3A and 3C, respectively. Furthermore, a reservoir 1a of the master cylinder 1 is connected with the reservoir 11B by a pipe line 13 provided with an on-off type solenoid valve 14.

At the time of ordinary braking of the known brake fluid pressure control device, fluid pressure of the master cylinder 1 is supplied to the wheel cylinders 4A and 4C for the front left and right wheels 3A and 3C through the pipe lines 2A and 2B, the solenoid valves 6A and 6B set to a shown position A and the solenoid valves 7A and 7B set to a shown position C, respectively and is also supplied from the pipe lines 8A and 8B to the rear right and left wheels 3B and 3D via the solenoid valves 9A and 9B set to a shown position F.

On the other hand, at the time of antiskid control of the known brake fluid pressure control device, working fluid in the wheel cylinders 3A to 3D is discharged from the solenoid valves 7A and 7B set to a position E and the solenoid valves 9A and 9B set to a position G to the reservoirs 11A and 11B through pipe lines 15A and 15B so as to perform pressure reduction. The working fluid in the reservoirs 11A and 11B is pumped up by the pumps 12A and 12B so as to be returned to the master cylinder 1 through the solenoid valves 6A and 6B set to the position A.

Furthermore, at the time of traction control of the known brake fluid pressure control device, the solenoid valve 14 is set to an open state so as to actuate the pump 12B. Thus, working fluid in the reservoir 1a is supplied to the wheel cylinder 4C for the front right driving wheel 3C through the pipe line 13, the pump 12A and the solenoid valve 7B set to the position C or is supplied from the discharge side 12b of the pump 12B to the wheel cylinder 4A for the front left wheel 3A by way of the solenoid valves 6A and 6B set to a position B and the solenoid valve 7A set to the position C.

In the known brake fluid pressure control device, the pipe line 13 for connecting the master cylinder 1 and the reservoir 11B is required to be provided for pressurizing at the time of traction control. Generally, in the brake fluid pressure control device of this kind, the solenoid valves 6, 7, 9 and 14, the pumps 12, etc. are formed of one module and the module is disposed at a position relatively distant from the master cylinder 1 in a motor vehicle. Therefore, the pipe line 13 becomes long necessarily and structure of the brake fluid pressure control device becomes complicated. Furthermore, flow resistance of the pipe line is large when the working fluid in the reservoir 1a is sucked by the pump 12B, which is not preferable for power efficiency of the pumps.

In addition, in the known brake fluid pressure control device, since the solenoid valve 14 should be provided in the pipe line 13 so as to connect the reservoirs 1a and 11B only at the time of traction control. Accordingly, the number of the components of the known brake fluid pressure control device is increased and structure of the known brake fluid pressure control device becomes complicated.

SUMMARY OF THE INVENTION

Accordingly, an essential object of the present invention is to provide, with a view to eliminating the above mentioned drawbacks of conventional brake fluid pressure control devices, a brake fluid pressure control device in which by adding a simple structure to a brake fluid pressure control device for antiskid control, not only antiskid control but traction control can be performed.

In order to accomplish this object of the present invention, a brake fluid pressure control device according to the present invention comprises: a main flow path for connecting, as one system, a first wheel brake for a driving wheel and a second wheel brake for a driven wheel with a master cylinder; a first reservoir which is provided on the main flow path; a fluid pressure adjusting means for selectively communicating the first and second wheel brakes with the master cylinder and the first reservoir, which is provided on the main flow path; a pump which sucks and pressurizes brake fluid in the first reservoir so as to discharge the brake fluid to a junction of the main flow path and the pump; the junction being disposed more adjacent to the master cylinder than the fluid pressure adjusting means is; a second reservoir for storing the brake fluid, which is communicated with the fluid pressure adjusting means and the second wheel brake; a directional control valve which is provided on the main flow path at one side of the junction adjacent to the master cylinder; the directional control valve being adapted to in its first state, communicate the master cylinder and the fluid pressure adjusting means with each other and in its second state, intercept communication between the master cylinder and the fluid pressure adjusting means; and a control means which at the time of traction control of the brake fluid pressure control device, not only sets the directional control valve to the second state but drives the pump so as to supply the brake fluid in the second reservoir to the first wheel brake through the fluid pressure adjusting means.

It is preferable that the brake fluid pressure control device of the present invention further comprises: a flow path for communicating the directional control valve and the second reservoir with each other; and a relief valve which is provided on the flow path so as to be opened when a pressure in the flow path at a side of the directional control valve has assumed a predetermined value or more; the directional control valve connecting the flow path and the fluid pressure adjusting means in the second state.

More specifically, the second reservoir comprises: a cylinder member for storing the brake fluid, which is formed with a cylinder chamber communicated with the fluid pressure adjusting means and the second wheel brake; and a piston member which is slidably fitted into the cylinder chamber in fluid-tight state.

At the time of ordinary braking in the brake fluid pressure control device of the above described arrangement, the directional control valve is connected with the wheel brakes through the fluid pressure adjusting means such that fluid pressure of the master cylinder is supplied to the wheel brakes.

Meanwhile, at the time of antiskid control, the fluid pressure adjusting means is connected with the first reservoir and the working fluid in the wheel brakes is discharged to the first reservoir. The working fluid in the first reservoir is sucked and discharged by the pump so as to be returned to the master cylinder through the junction.

Furthermore, at the time of traction control, the directional control valve is set to the second position so as to intercept the fluid pressure control means from the master cylinder, while a fluid passage extending from the second reservoir, via the fluid pressure adjusting means and the pump, to the wheel brake exhibiting slip symptom is formed such that the working fluid in the second reservoir is supplied to the above mentioned wheel brake by driving the pump. At this time, when the flow path for communicating the directional control valve and the second reservoir with each other is provided and the relief valve is provided on the flow path as described above, the working fluid discharged by the pump is returned to the second reservoir by way of the directional control valve and the flow path when the working fluid has been excessively supplied to the first wheel brake for the driving wheel.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
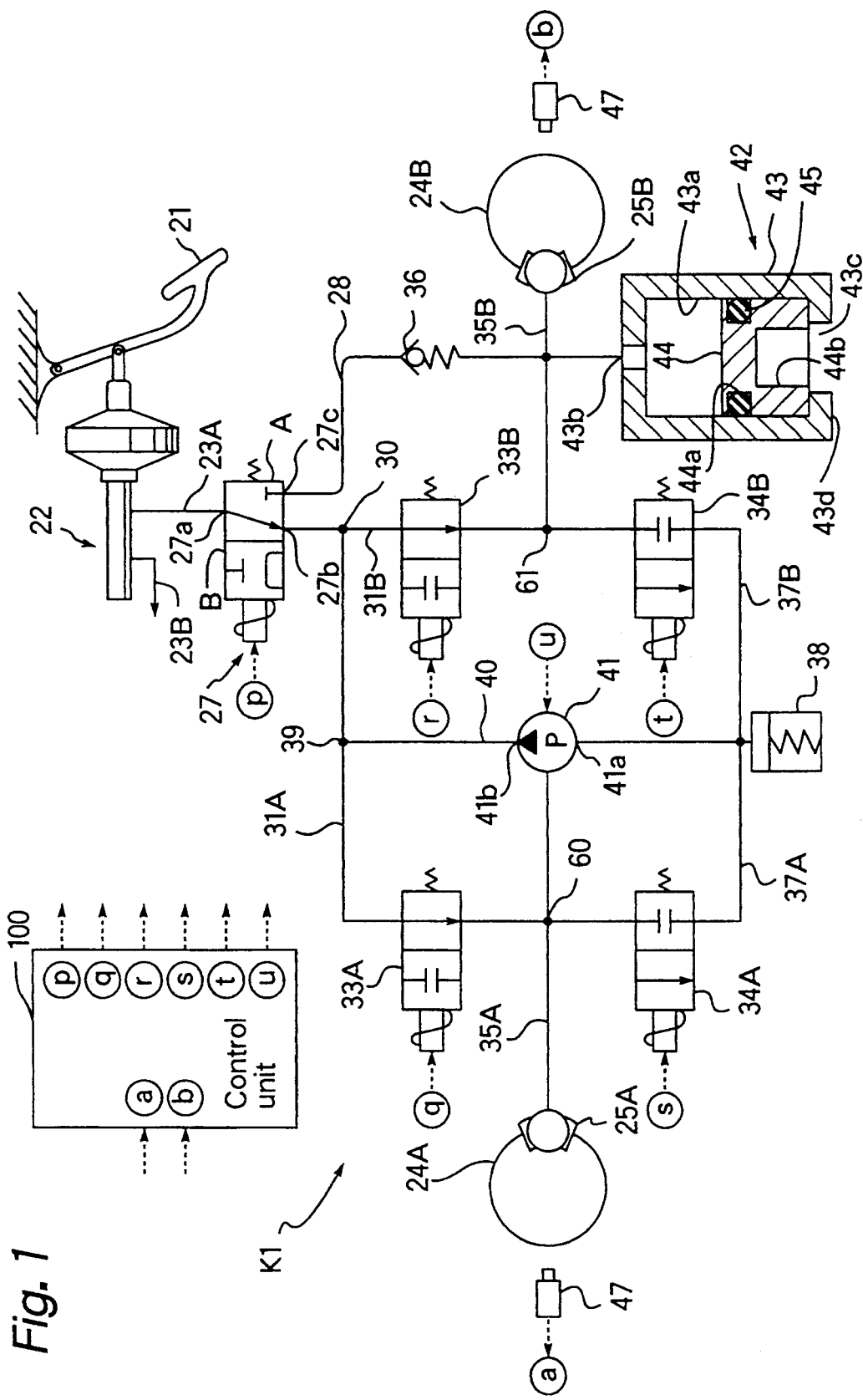
FIG. 1 is a schematic diagram of a brake fluid pressure control device according to a first embodiment of the present invention.

Referring now to the drawings, there is shown in FIG. 1, a brake fluid pressure control device K1 for a four-wheel motor vehicle, according to a first embodiment of the present invention. First and second main flow paths 23A and 23B are connected with a master cylinder 22 which is actuated by a brake pedal 21. The first main flow path 23A is provided for communicating a wheel brake 25A for a front left driving wheel 24A and a wheel brake 25B for a rear right driven wheel 24B with the master cylinder 22.

A directional control valve 27 provided in the first main flow path 23A is a three port connection and two position type directional control valve. A first port 27a of the directional control control valve 27 is connected with one side of the first main flow path 23A adjacent to the master cylinder 22, while second and third ports 27b and 27c of the directional control valve 27 are, respectively, connected with the other side of the first main flow path 23A adjacent to a branch point 30 of the first main flow path 23A and a flow path 28, respectively.

At a shown position A, the directional control valve 27 not only connects the first port 27a and the second port 27b so as to communicate the master cylinder 22 and the first main flow path 23A with each other but intercepts the flow path 28. On the other hand, at a position B, the directional control valve 27 not only intercepts the master cylinder 22 but connects the second port 27b and the third port 27c so as to communicate the first main flow path 23A and the flow path 28 with each other. At the branch point 30, the first main flow path 23A is branched into a first branch flow path 31A for the front left wheel 24A and a second branch flow path 31B for the rear right wheel 24B.

A pressure increasing valve 33A and a pressure reducing valve 34A, which are each formed by an on-off type solenoid valve, are successively provided in the first branch flow path 31A and a branch point 60 of the first branch flow path 31A intermediate between the pressure increasing valve 33A and the pressure reducing valve 34A is connected, via a flow path 35A, with the wheel brake 25A for the front left wheel 24A. The pressure increasing valve 33A is normally open, while the pressure reducing valve 34A is normally closed. Meanwhile, the pressure reducing valve 34A is connected, through a discharge flow path 37A, with a first reservoir 38 for antiskid control to be described later.

In the same manner as the first branch flow path 31A, a normally open pressure increasing valve 33B and a normally closed pressure reducing valve 34B, which are each formed by an on-off type solenoid valve, are successively provided in the second branch flow path 31B and a branch point 61 of the second branch flow path 31B intermediate between the pressure increasing valve 33B and the pressure reducing valve 34B is connected, through a flow path 35B, with the wheel brake 25B for the rear right wheel 24B. Furthermore, the pressure reducing valve 34B is connected with the above mentioned first reservoir 38 by way of a discharge flow path 37B.

Meanwhile, in this embodiment, a return flow path 40 for connecting the first reservoir 38 and the first branch flow path 31A is connected, at a junction 39, to the first branch flow path 31A. The junction 39 of the first branch flow path 31A is disposed at one side of the pressure increasing valves 33A and 33B adjacent to the master cylinder 22 and a pump 41 is provided in the return flow path 40. The pump 41 is driven by a motor (not shown) so as to return working fluid in the first reservoir 38 to the master cylinder 22.

One end of the flow path 28 is connected with the third port 27c of the directional control valve 27, while the other end of the flow path 28 is connected with the flow path 35B leading to the wheel brake 25B for the rear right driven wheel 24B. A relief valve 36 for passing therethrough working fluid from the master cylinder 22 only when pressure at the directional control valve 27 has reached a predetermined value or more is provided in the flow path 28. Meanwhile, a second reservoir 42 for traction control is provided in the flow path 35B for the wheel brake 25B.

The second reservoir 42 includes a cylinder member 43 formed with a cylinder chamber 43a and a piston member 44 slidably fitted into the cylinder chamber 43a in fluid-tight state. A port 43b connected with the flow path 35B is provided at one end of the cylinder member 43 in a sliding direction of the piston member 44. A mouth 43c is provided at the other end of the cylinder member 43 and the cylinder member 43 has a radially inwardly extending flange 43d at the mouth 43c such that the flange 43d acts as a stopper for the piston member 44. The piston member 44 is so formed as to close a whole cross section of the cylinder chamber 43a. At one side of the piston member 44 adjacent to the port 43b, an annular groove 44a is formed on an outer periphery of the piston member 44. A seal ring 45 is fitted into the annular groove 44a so as to secure fluid tightness between the outer periphery of the piston member 44 and an inner periphery of the cylinder chamber 43a. A recess 44b is provided at the other side of the piston member 44 so as to confront the mouth 43c. Working fluid is filled into the cylinder chamber 43a of the second reservoir 42 so as to pressurize the wheel brake 25A for the front left wheel 24A at the time of traction control.

A wheel speed sensor 47 is mounted on each of the front left wheel 24A and the rear right wheel 24B. On the basis of signals from the wheel speed sensor 47, an electronic control unit 100 detects generation and cancellation of locking symptom and slip symptom. The electronic control unit 100 has input terminals a and b for receiving the signals from the wheel speed sensors 47 for the front left wheel 24A and the rear right wheel 24B and output terminals p, q, r, s, t and u for outputting signals to the directional control valve 27, the pressure increasing valves 33A and 33B, the pressure reducing valves 34A and 34B and the pump 41, respectively. The pressure increasing valves 33A and 33B and the pressure reducing valves 34A and 34B are opened and closed by signals from the electronic control unit 100 and constitute a fluid pressure adjusting means for selectively connecting the wheel brakes 25A and 25B with the master cylinder 22 and the first reservoir 38. Meanwhile, a motor for driving the pump 41 and the directional control valve 27 are also adapted to be actuated by signals from the electronic control unit 100.

In the first embodiment, the first main flow path 23A for the wheel brakes 25A and 25B selectively communicates the flow path 28 for the second reservoir 42 for traction control with the directional control valve 27 and the master cylinder 22 as described above. Since a flow path connecting the reservoir and the master cylinder is not additionally provided for traction control, the brake fluid pressure control device K1 is structurally simplified in comparison with the known brake fluid control device referred to earlier. Meanwhile, the second main flow path 23B has a construction similar to that of the first main flow path and communicates a front right wheel and a rear left wheel (not shown) with each other.

Hereinbelow, operational features of the brake fluid pressure control device K1 are described. Initially, at the time of ordinary braking as shown in FIG. 1, the directional control valve 27 is set to the position A, while the pressure increasing valves 33A and 33B are opened and the pressure reducing valves 34A and 34B are closed. In this state, since a flow path leading from the master cylinder 22 to the wheel brakes 25A and 25B through the directional control valve 27 and the pressure increasing valves 33A and 33B is formed, working fluid in an amount corresponding to a working distance of the brake pedal 21 is supplied to the wheel brakes 25A and 25B. Then, when the electronic control unit 100 has detected locking symptom, a pressure reducing mode, a pressure increasing mode and a hold mode to be described below are changed over according to wheel speed and vehicle body speed such that antiskid control is performed. During this antiskid control, the directional control valve 27 is set to the position A in the same manner as ordinary braking referred to above.

Firstly, in the pressure reducing mode, the pressure increasing valves 33A and 33B are closed, while the pressure reducing valves 34A and 34B are opened such that working fluid in the wheel brakes 25A and 25B is discharged to the first reservoir 38 through the pressure reducing valves 34A and 34B. Then, the motor is started so as to drive the pump 41 such that working fluid in the first reservoir 38 is returned to the master cylinder 22 via the return flow path 40.

Secondly, in the pressure increasing mode, the pressure reducing valves 34A and 34B are closed, while the pressure increasing valves 33A and 33B are opened for a time period corresponding to a pressure increasing width so as to supply working fluid to the wheel brakes 25A and 25B from the master cylinder 22.

Thirdly, in the hold mold, the pressure increasing valves 33A and 33B and the pressure reducing valves 34A and 34B are closed so as to hold fluid pressure of the wheel brakes 25A and 25B.

Meanwhile, in this embodiment, when the electronic control unit 100 has detected slip symptom of the front left driving wheel 24A, a pressure increasing mode, a pressure reducing mode and a hold mode to be described below are changed over according to slip state such that traction control is performed. In this traction control, the direction of control valve 27 is set to the position B, as shown in FIG. 2, and the master cylinder 22 is shut off from the wheel brakes 25A and 25B, while the first main flow path 23A and the flow path 28 are connected with each other.

Firstly, in the pressure increasing mode, the pressure increasing valve 33A of the first branch flow path 31A is opened and the pressure increasing valve 33B of the second branch flow path 31B is closed. Furthermore, the pressure reducing valve 34A of the first branch flow path 31A is closed and the pressure reducing valve 34B of the second branch flow path 31B is opened. In this state, the pump 41 is driven such that working fluid stored in the second reservoir 42 is sucked from the suction port 41a of the pump 41 via the pressure reducing valve 34B, as shown by the dotted line in FIG. 2. Working fluid discharged from discharge port 41b of the pump 41 is supplied to the wheel brake 25A through the junction 39 and the pressure increasing valve 34A of the first branch flow path 31A.

In the first embodiment, during traction control, since it is so arranged that working fluid sucked from the second reservoir 42 connected with the rear right driven wheel 24B is supplied to the wheel brake 25A of the front left driving wheel 24A by the pump 41, as described above, the suction stroke of the working fluid is short and pipeline resistance is low.

Figure 2:
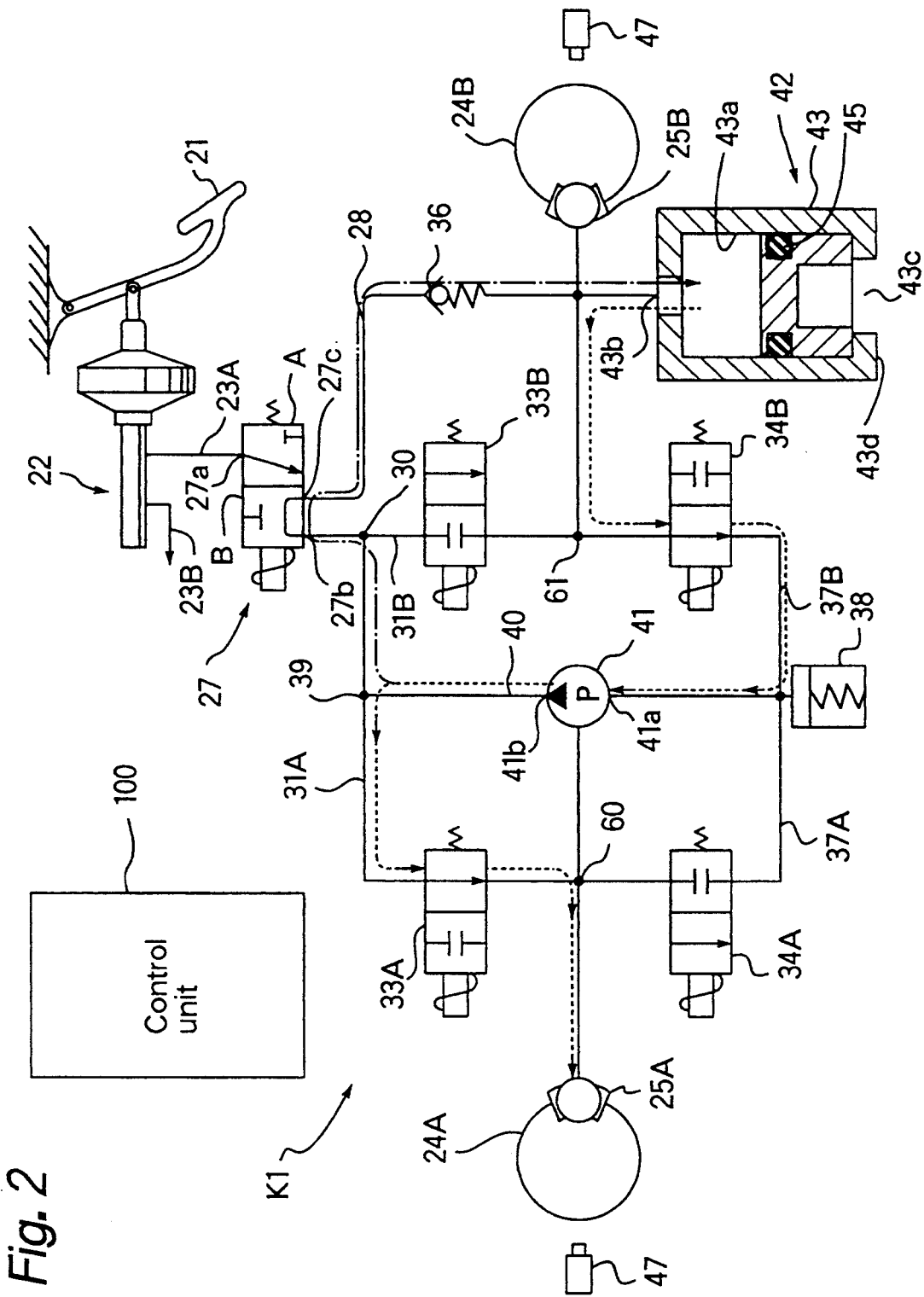
FIG. 2 is a schematic diagram showing traction control in the brake fluid pressure control device of FIG. 1.

In the pressure increasing mode, when the working fluid has been supplied to the wheel brake 25A excessively, the pressure increasing valve 33A is closed and thus, the excessive working fluid is returned to the second reservoir 42 through the directional control valve 27 and the relief valve 36 as shown by the one-dot chain line in FIG. 2.

Secondly, in the hold mode, the pressure increasing valves 33A and 33B on the first and second branch flow paths 31A and 31B and the pressure reducing valves 34A and 34B on the first and second branch flow paths 31A and 31B are closed so as to hold fluid pressure of the wheel brakes 25A and 25B.

Thirdly, in the pressure reducing mode, the pressure increasing valve 33A on the first branch flow path 31A is closed, while the pressure reducing valve 34A on the first branch flow path 31A is opened. Thus, working fluid in the wheel brake 25A is discharged to the first reservoir 38 via the pressure reducing valve 34A. Then, the pump 41 is driven by the motor so as to return the working fluid in the first reservoir 38 to the second reservoir 42 by way of the return flow path 40, the directional control valve 27 set to the position A and the flow path 28.

Figure 3:
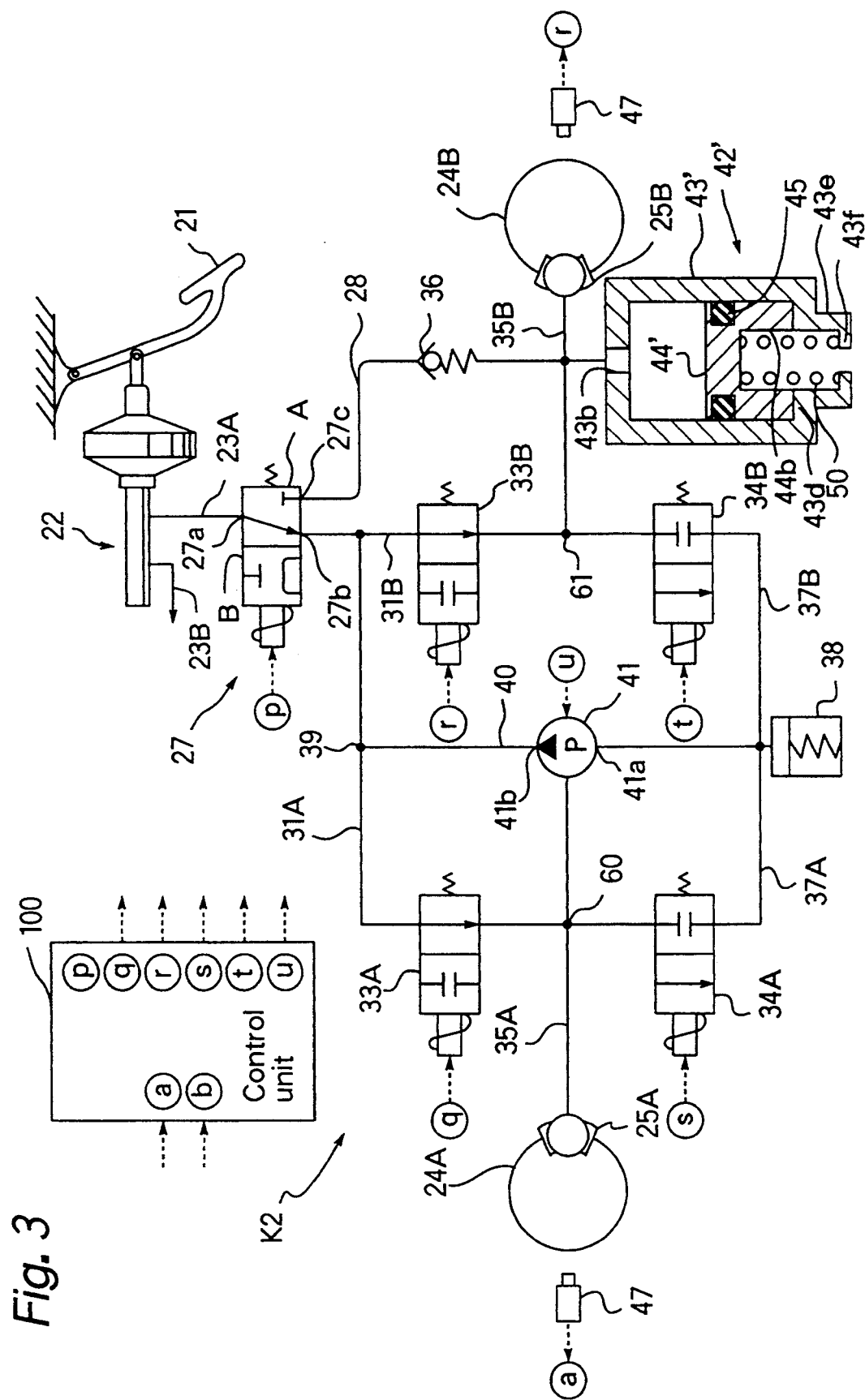
FIG. 3 is a schematic diagram of a brake fluid control device according to a second embodiment of the present invention.

FIG. 3 shows a brake fluid pressure control device K2 according to a second embodiment of the present invention. In the brake fluid pressure control device K2, the second reservoir 42 of the brake fluid pressure control device K1 is replaced by a second reservoir 42' in which a compression spring 50 is provided between a cylinder member 43' and a piston member 44'. In the second reservoir 42', a cylindrical portion 43e extends from the flange 43d in a sliding direction of the piston member 44' and is formed, at its distal end, with a radially inwardly extending flange 43f acting as a stopper for the compression spring 50. The compression spring 50 is provided between a bottom of the recess 44b of the piston member 44' and the flange 43f of the cylinder member 43'. An urging force of the compression spring 50 is so set as to be smaller than a sliding resistance of the piston member 44' relative to the cylinder member 43'. Since other constructions of the brake fluid pressure control device K2 are similar to those of the brake fluid pressure control device K1, the description is abbreviated for the sake of brevity.

In the brake fluid pressure control device K2 of the above described arrangement, since resistance against sliding of the piston member 44' relative to the cylinder member 43' is small, the piston member 44' can be slid relative to the cylinder member 43' by a small force.

When the pump 41 is driven in the pressure increasing mode at the time of traction control in the brake fluid pressure control device K2, the piston member 44' can be easily slid relative to the cylinder member 43' as described above. As a result, since working fluid in the second reservoir 42' can be sucked into the pump 41 highly efficiently so as to be discharged to the wheel brake 25A.

Figure 4:
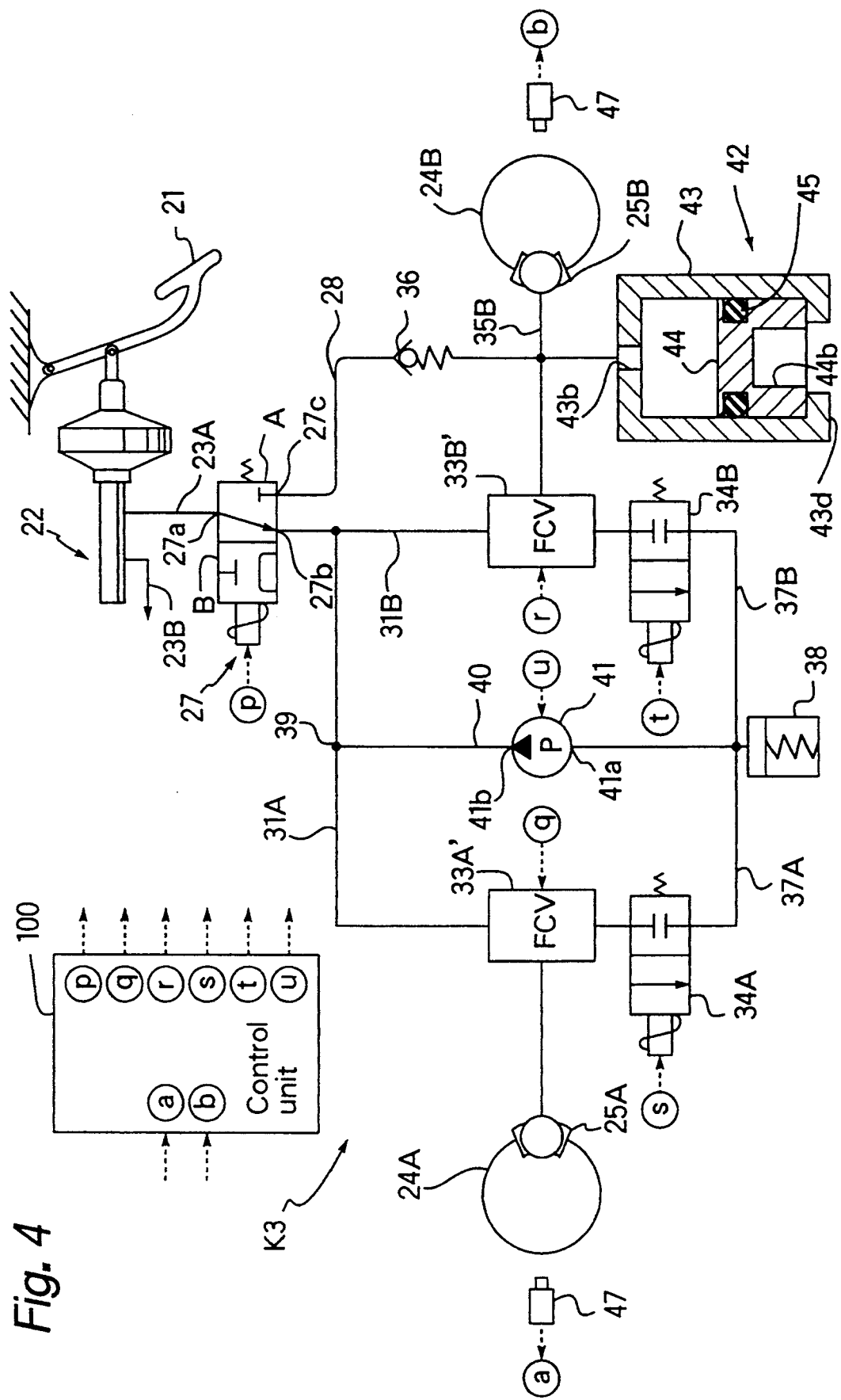
FIG. 4 is a schematic diagram of a brake fluid pressure control device according to third embodiment of the present invention.

FIG. 4 shows a brake fluid pressure control device K3 according to a third embodiment of the present invention. In the brake fluid pressure control device K3, the pressure increasing valves 33A and 33B which are, respectively, provided on the first branch flow path 31A for the front left driving wheel 24A and the second branch flow path 31B for the rear right driven wheel 24B are replaced by known flow control valves 33A' and 33B'.

Figure 5:
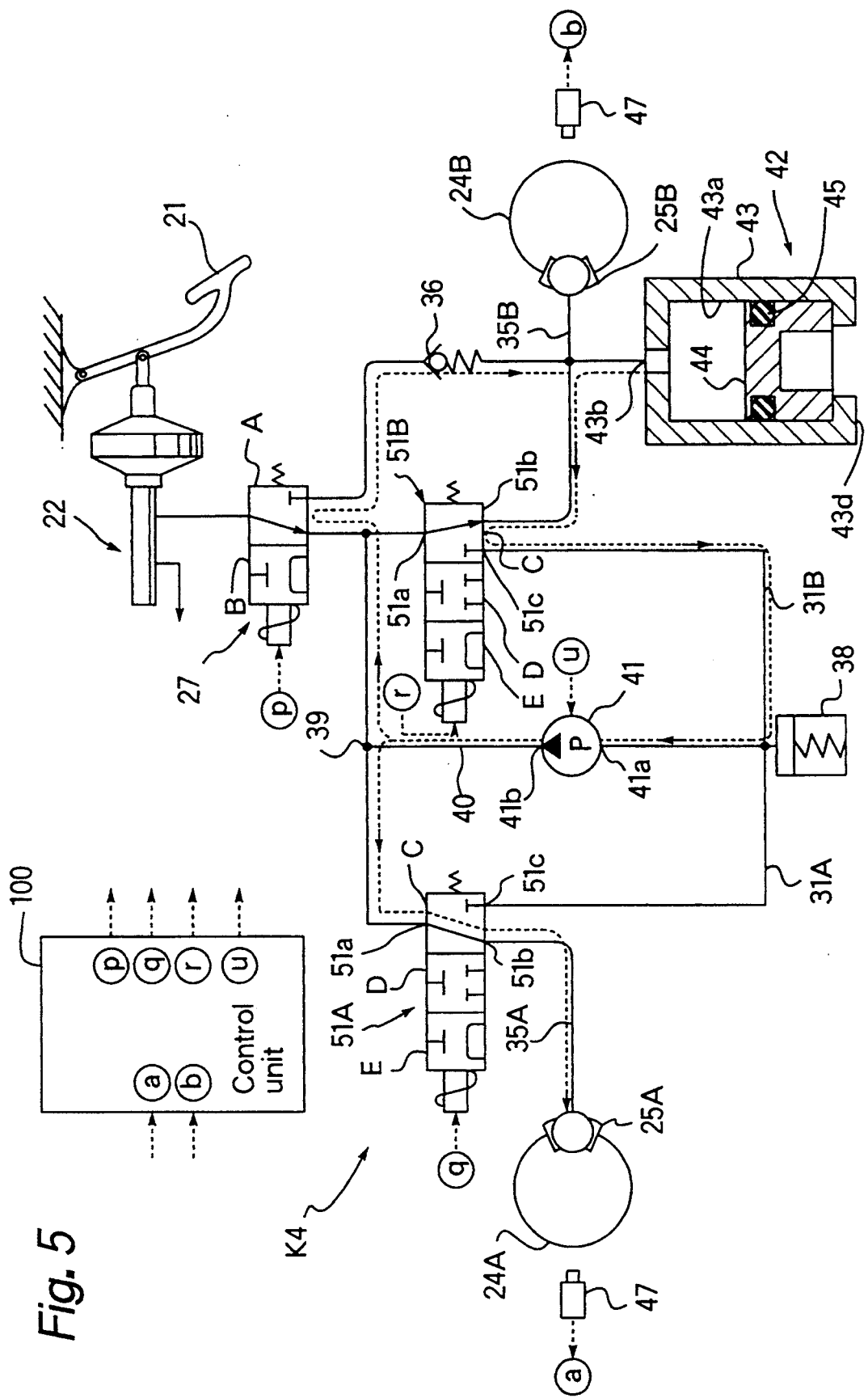
FIG. 5 is a schematic view of a brake fluid pressure control device according to a fourth embodiment of the present invention.
Figure 6:
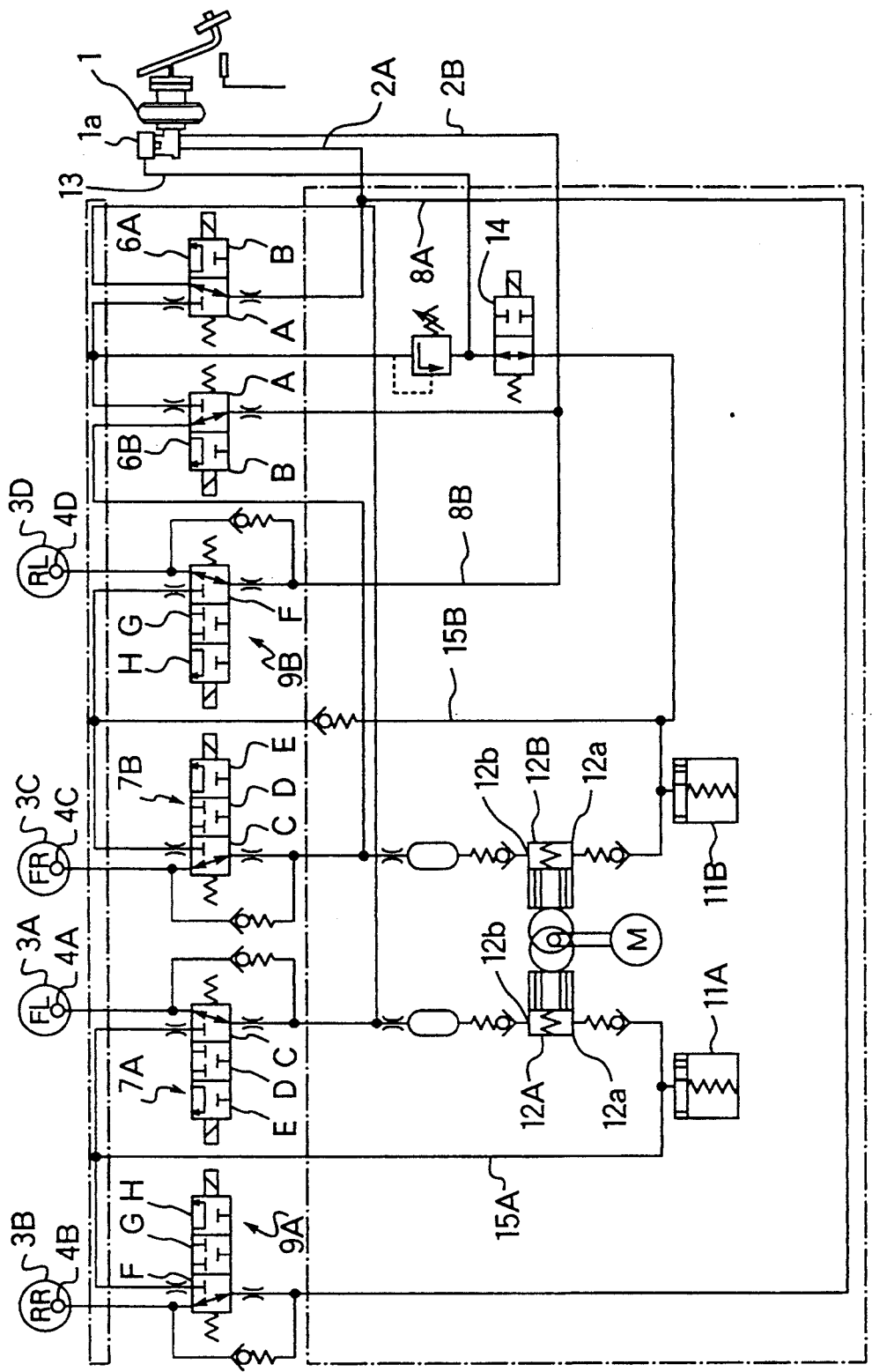
FIG. 6 is a schematic diagram showing one example of a prior art brake fluid pressure control device (already referred to).

FIG. 5 shows a brake fluid pressure control device K4 according to a fourth embodiment of the present invention. In the brake fluid pressure control device K4, three port connection and three position solenoid valves 51A and 51B are, respectively, provided on the first and second branch flow paths 31A and 31B so as to act as a fluid pressure adjusting means. In each of the solenoid valves 51A and 51B, a first port 51a is connected with the directional control valve 27 and a third port 51c is connected with the first reservoir 38. Meanwhile, second ports 51b of the solenoid valves 51A and 51B are, respectively, connected with the wheel brakes 25A and 25B.

At the time of ordinary braking in the brake fluid pressure control device K4, the solenoid valves 51A and 51B are set to a position C so as to not only communicate the directional control valve 27 with the wheel brakes 25A and 25B, respectively but intercept the wheel brakes 25A and 25B from the first reservoir 38.

Meanwhile, at the time of antiskid control in the brake fluid pressure control device K4, the solenoid valves 51A and 51B are set to a position E so as to not only discharge working fluid in the wheel brakes 25A and 25B to the first reservoir 38 by connecting the wheel brakes 25A and 25B with the first reservoir 38 but intercept the wheel brakes 25A and 25B from the master cylinder 22. When working fluid in the first reservoir 38 is returned to the master cylinder 22, the pump 41 is driven so as to return 10 the working fluid in the first reservoir 38 to the master cylinder 22 through the directional control valve 27 set to the position A. Furthermore, in case fluid pressure of the wheel brakes 25A and 25B is held, the solenoid valves 51A and 51B are set to a position E in FIG. 5.

Furthermore, at the time of traction control in the brake fluid pressure control device K4, the solenoid valve 51A for the front left driving wheel 24A is set to the position C, while the solenoid valve 51B for the rear right wheel 24B is set to the position E, while the directional control valve 27 is set to the position B. In this state, the pump 41 is driven so as to supply working fluid in the second reservoir 42 to the wheel brake 25A through the solenoid valve 51B, the pump 41, the junction 39 and the solenoid valve 51A.

The present invention is not limited to the above described first to fourth embodiments but can be modified variously. For example, in the foregoing embodiments, the wheel brakes are mounted by X-shaped piping but the present invention is not limited to X-shaped piping. Namely, piping may also be performed such that the wheel brakes for the driving wheel and the driven wheel are connected, as one system, with the master cylinder and the second reservoir is connected with the wheel brake for the driven wheel.

As will be clear from the foregoing description, the brake fluid pressure control device of the present invention includes the second reservoir which has the cylinder chamber communicating with the fluid pressure adjusting means and the wheel brake for the driven wheel and the piston member slidably fitted into the cylinder chamber in fluid-tight state. The brake fluid pressure control device further includes the directional control valve which is disposed on the main flow path at one side of the junction of the discharge side of the pump and the main flow path adjacent to the master cylinder. The directional control valve communicates the master cylinder and the fluid pressure adjusting means with each other in the first state and communicates, in the second state, the fluid pressure adjusting means with the flow path communicating the directional control valve and the cylinder chamber with each other.

Therefore, in accordance with the present invention, since a flow path for supplying working fluid at the time of traction control is not required to be provided from the master cylinder to the fluid pressure adjusting means, the brake fluid pressure control device can be simplified structurally and a piping process for the flow path can be eliminated, thereby resulting in reduction of its production cost.

Meanwhile, when traction control is performed in the arrangement provided with the second reservoir, various advantages can be achieved that not only flow line resistance at the time of suction of the pump is lessened but operational efficiency of the pump can be raised in comparison with a case in which working fluid is sucked from a flow path connected with the master cylinder.

What is claimed is:

1. A brake fluid pressure control device comprising:
a main flow path for connecting, as one system, a first wheel brake of a driving wheel and a second wheel brake of a driven wheel with a master cylinder;
a first reservoir which is provided on the main flow path;
fluid pressure adjusting means for selectively communicating the first and second wheel brakes with the master cylinder and the first reservoir, which is provided on the main flow path;
a pump which sucks and pressurizes brake fluid in the first reservoir so as to discharge the brake fluid to a junction of the main flow path and the pump;
the junction being disposed closer to the master cylinder than the fluid pressure adjusting means;
a second reservoir for storing the brake fluid, which is communicated with the fluid pressure adjusting means and the second wheel brake;
a directional control valve which is provided on the main flow path at one side of the function adjacent to the master cylinder;
the directional control valve being adapted, in a first state, to enable communication between the master cylinder and the fluid pressure adjusting means and, in a second state, to interrupt communication between the master cylinder and the fluid pressure adjusting means; and
control means, operative at the time of traction control of the brake fluid pressure control device, for setting the directional control valve to the second state and driving the pump so as to supply the brake fluid in the second reservoir to the first wheel brake through the fluid pressure adjusting means.

2. A brake fluid pressure control device according to claim 1, further comprising:
a flow path for enabling the directional control valve and the second reservoir to communicate with each other; and
a relief valve provided on the flow path and adapted to be opened when a pressure in the flow path at a side of the directional control valve has exceeded a predetermined value;
the directional control valve connecting the flow path and the fluid pressure adjusting means in the second state.

3. A brake fluid pressure control device according to claim 1, wherein the second reservoir comprises:
a cylinder member for storing the brake fluid, the cylinder member having a cylinder chamber in communication with the fluid pressure adjusting means and the second wheel brake; and
a piston member which is slidably fitted into the cylinder chamber in a fluid-tight state.

4. A brake fluid pressure control device according to claim 2, wherein the second reservoir comprises:
a cylinder member for storing the brake fluid, the cylinder member including a cylinder chamber in communication with the fluid pressure adjusting means and the second wheel brake; and
a piston member which is slidably fitted into the cylinder chamber in a fluid-tight state.

* * * * *